United States Patent
Lacroix

(10) Patent No.: US 6,825,270 B1
(45) Date of Patent: Nov. 30, 2004

(54) ANTISTATIC STYRENE POLYMER COMPOSITIONS

(75) Inventor: Christophe Lacroix, Puteaux (FR)

(73) Assignee: Atofina, Paris la Defense Cedex (FR)

( * ) Notice: Subject to any disclaimer, the term of this patent is extended or adjusted under 35 U.S.C. 154(b) by 157 days.

(21) Appl. No.: 09/806,710

(22) PCT Filed: Jun. 26, 2000

(86) PCT No.: PCT/FR00/02140

§ 371 (c)(1),
(2), (4) Date: Jul. 7, 2001

(87) PCT Pub. No.: WO01/10951

PCT Pub. Date: Feb. 15, 2001

(30) Foreign Application Priority Data

Aug. 4, 1999 (FR) .......................... 99 10125

(51) Int. Cl.$^7$ .............................. C08L 77/00
(52) U.S. Cl. ...................... 525/66; 525/92 A
(58) Field of Search .................. 525/66, 92 A, 525/179

(56) References Cited

U.S. PATENT DOCUMENTS 6,303,689 B1 * 10/2001 Maillet et al. ............... 525/66

FOREIGN PATENT DOCUMENTS

| DE | 4235505 | 4/1994 |
|----|---------|--------|
| EP | 0242158 | 10/1987 |
| JP | 6329790 | 11/1994 |
| JP | 7157659 | 6/1995 |
| KR | 9411415 | 12/1994 |

OTHER PUBLICATIONS

Chemical Abstracts vol. 123 No. 14 (Oct. 2, 1995) abstract No. 171361.
Chemical Abstracts vol. 122, No. 24, (Jun. 12, 1995) abstract no .292469.
Database WPI Section Ch, Week 199642, Class A13, AN 1996–42374.

* cited by examiner

*Primary Examiner*—Ana Woodward
(74) *Attorney, Agent, or Firm*—Millen, White, Zelano & Branigan, P.C.

(57) ABSTRACT

A composition and articles, e.g. computer casings comprising, per 100 parts by weight: 99 to 60 parts of a styrene polymer (A), 1 to 40 parts of (B)+(C), (B) being a copolymer containing polyamide blocks and polyether blocks comprising essentially ethylene oxide units —($C_2H_4$—O)—, (C) being a compatibilizer chosen from (C1) low-mass copolymers of styrene and of an unsaturated carboxylic acid anhydride, (C2) copolymers of ethylene and of an unsaturated carboxylic acid anhydride, (C3) copolymers of ethylene and of an unsaturated epoxy, (C4) block copolymers (C4) SBS or SIS grafted by an unsaturated carboxylic acid or an unsaturated carboxylic acid anhydride and mixtures thereof, the weight ratio (B)/(C) being between 2 and 10.

22 Claims, No Drawings

ANTISTATIC STYRENE POLYMER COMPOSITIONS

The present invention relates to antistatic styrene polymer compositions and more specifically to a composition comprising a styrene polymer (A), a copolymer (B) containing polyamide blocks and polyether blocks essentially comprising ethylene oxide units —($C_2H_4$—O)— and a compatibilizer (C).

The aim of the invention is to give the styrene polymer (A) antistatic properties. The formation and retention of static-electricity charges on the surface of most plastics are known. The presence of static electricity on thermoplastic films results, for example, in these films sticking to each other, making them difficult to separate. The presence of static electricity on packaging films may cause the accumulation of dust on the articles to be packaged and thus impede their use. Styrene resins such as, for example, polystyrene or ABS are used for making casings for computers, telephones, televisions, photocopiers and many articles. Static electricity causes dust to accumulate, but above all it can damage the microprocessors or the components of the electronic circuits contained in these articles.

The prior art has described antistatic agents, such as ionic surfactants of the ethoxylated amine or sulphonate type, which are added to polymers. However, the antistatic properties of the polymers depend on the ambient moisture and are not permanent since these agents migrate to the surface of the polymers and disappear. It has therefore been proposed to use, as antistatic agents, copolymers containing polyamide blocks and hydrophilic polyether blocks, these agents having the advantage of not migrating and therefore of giving permanent antistatic properties which are also independent of the ambient moisture.

Japanese Patent Application JP 60,170,646 A published on 4 Sep. 1985 describes compositions consisting of 0.01 to 50 parts of a polyether-block-amide and 100 parts of polystyrene, these being useful for making sliding parts and wear-resistant parts. The antistatic properties are not mentioned.

Patent Application EP 167,824 published on 15 Jan. 1986 describes compositions similar to previous ones and, in one embodiment of the invention, polystyrene may be blended with a polystyrene functionalized by an unsaturated carboxylic anhydride. These compositions are useful for making injection-moulded parts. The antistatic properties are not mentioned.

Japanese Patent Application JP 60,023,435 A published on 6 Feb. 1985 describes antistatic compositions comprising 5 to 80% of polyetheresteramide and 95 to 20% of a thermoplastic resin chosen from among polystyrene, ABS and PMMA, this resin being functionalized by acrylic acid or maleic anhydride. The amount of polyetheresteramide in the examples is 30% by weight of the compositions.

Patent EP 242,158 describes antistatic compositions comprising 1 to 40% of polyetheresteramide and 99 to 60% of a thermoplastic resin chosen from styrene resins, PPO and polycarbonate. According to a preferred embodiment, the compositions also comprise a vinyl polymer functionalized by a carboxylic acid, which may, for example, be a polystyrene modified by methacrylic acid.

The prior art shows either blends (i) of styrene resin and polyetheresteramide without a compatibilizer, or blends (ii) of polyetheresteramide and functionalized styrene resin, or else blends (iii) of polyetheresteramide, non-functionalized styrene resin and functionalized styrene resin.

The blends (i) are antistatic if the polyetheresteramide is properly chosen, but they have poor mechanical properties—in particular, the elongation at break is very much less than that of the styrene resin by itself.

As regards the blends (ii) and (iii), it is necessary to use a functionalized styrene resin which is complicated and expensive. The aim of the invention is to render antistatic the ordinary styrene resins used for making the abovementioned articles, these resins not being functionalized. It has now been discovered that, by using particular compatibilizers, it is possible to obtain antistatic styrene resin compositions which retain the properties of the base styrene resin and even have a markedly improved elongation at break.

SUMMARY

The present invention relates to a composition comprising, per 100 parts by weight:
  99 to 60 parts of a styrene polymer (A),
  1 to 40 parts of (B)+(C),
(B) being a copolymer containing polyamide blocks and polyether blocks comprising essentially ethylene oxide units —($C_2H_4$—O)—,
(C) being a compatibilizer chosen from low-mass copolymers (C1) of styrene and of an unsaturated carboxylic acid anhydride, copolymers (C2) of ethylene and of an unsaturated carboxylic acid anhydride and copolymers (C3) of ethylene and of an unsaturated epoxy, blocks copolymers (C4) SBS or SIS grafted by an unsatured carboxylic acid or an unsatured carboxylic acid anhydride and mixtures thereof, (B)/(C) being between 2 and 10.

By way of example of styrene polymer (A), mention may be made of polystyrene, elastomer-modified polystyrene, styrene-acrylonitrile copolymers (SAN), elastomer-modified SAN, particularly ABS which is obtained, for example, by grafting (graft polymerization) of styrene and acrylonitrile on a polybutadiene or butadiene-acrylonitrile copolymer backbone, and blends of SAN and ABS. The abovementioned elastomers may be, for example, EPR (the abbreviation for ethylene-propylene rubber or ethylene-propylene elastomer), EPDM (the abbreviation for ethylene-propylene-diene rubber or ethylene-propylene-diene elastomer), polybutadiene, acrylonitrile-butadiene copolymer, polyisoprene or isoprene-acrylonitrile copolymer.

In the polymers (A) that have just been mentioned, part of the styrene may be replaced with unsaturated monomers copolymerizable with styrene; by way of example, mention may be made of alpha-methylstyrene and (meth)acrylic esters. As examples of styrene copolymers, mention may also be made of chloropolystyrene, poly-alpha-methylstyrene, styrene-chlorostyrene copolymers, styrene-propylene copolymers, styrene-butadiene copolymers, styrene-isoprene copolymers, styrene-vinyl chloride copolymers, styrene-vinyl acetate copolymers, styrene-alkyl acrylate (methyl, ethyl, butyl, octyl or phenyl acrylate) copolymers, styrene-alkyl methacrylate (methyl, ethyl, butyl or phenyl methacrylate) copolymers, styrene-methyl chloroacrylate copolymers and styrene-acrylonitrile-alkyl acrylate copolymers. In these copolymers, the comonomer content will generally be up to 20% by weight. The present invention also relates to metallocene polystyrenes having a high melting point.

It would not be outside the scope of the invention if (A) were a blend of two or more of the above polymers.

The polymers (B) containing polyamide blocks and polyether blocks result from the copolycondensation of polyamide blocks having reactive end groups with polyether blocks having reactive end groups, such as, inter alia:

1) polyamide blocks having diamine chain ends with polyoxyalkylene blocks having dicarboxylic chain ends;

2) polyamide blocks having dicarboxylic chain ends with polyoxyalkylene blocks having diamine chain ends obtained by cyanoethylation and hydrogenation of aliphatic dihydroxylated alpha,omega-polyoxyalkylene blocks called polyetherdiols;

3) polyamide blocks having dicarboxylic chain ends with polyetherdiols, the products obtained being, in this particular case, polyetheresteramides. The copolymers (B) are advantageously of this type.

The polyamide blocks having dicarboxylic chain ends stem, for example, from the condensation of alpha,omega-aminocarboxylic acids, of lactams or of dicarboxylic acids and diamines in the presence of a chain-stopper dicarboxylic acid.

The number-average molar mass $\overline{M}n$ of the polyamide blocks is between 300 and 15,000 and preferably between 600 and 5000. The mass $\overline{M}n$ of the polyether blocks is between 100 and 6000 and preferably between 200 and 3000.

The polymers containing polyamide blocks and polyether blocks may also include randomly distributed units. These polymers may be prepared by the simultaneous reaction of the polyether and of the polyamide-block precursors.

For example, it is possible to react a polyetherdiol, a lactam (or an alpha,omega-amino acid) and a chain-stopper diacid in the presence of a little water. What is obtained is a polymer having essentially polyether blocks and polyamide blocks of very variable length but also the various reactants which, having reacted randomly, are distributed randomly along the polymer chain.

These polymers containing polyamide blocks and polyether blocks, which stem from the copolycondensation of polyamide and polyether blocks prepared beforehand or from a one-step reaction, have, for example, Shore D hardnesses which may be between 20 and 75, advantageously between 30 and 70, and an intrinsic viscosity between 0.8 and 2.5 measured in metacresol at 250° C. for an initial concentration of 0.8 g/100 ml. The MFI values may be between 5 and 50 (235° C. under a load of 1 kg).

The polyetherdiol blocks are either used as they are and copolycondensed with polyamide blocks having carboxylic end groups, or they are aminated in order to be converted into polyetherdiamines and condensed with polyamide blocks having carboxylic end groups. They may also be mixed with polyamide precursors and a chain stopper in order to make the polymers containing polyamide blocks and polyether blocks having randomly distributed units.

Polymers containing polyamide blocks and polyether blocks are described in Patents U.S. Pat. No. 4,331,786, U.S. Pat. No. 4,115,475, U.S. Pat. No. 4,195,015, U.S. Pat. No. 4,839,441, U.S. Pat. No. 4,864,014, U.S. Pat. No. 4,230,838 and U.S. Pat. No. 4,332,920.

According to a first embodiment of the invention, the polyamide blocks having dicarboxylic chain ends stem, for example, from the condensation of alpha,omega-aminocarboxylic acids, of lactams or of dicarboxylic acids and diamines in the presence of a chain-stopper dicarboxylic acid. By way of example of alpha,omega-aminocarboxylic acids mention may be made of aminoundecanoic acid, by way of example of lactams mention may be made of caprolactam and lauryllactam, by way of example of dicarboxylic acids mention may be made of adipic acid, decanedioic acid and dodecanedioic acid and by way of example of a diamine mention may be made of hexamethylene diamine. Advantageously, the polyamide blocks are of nylon-12 (PA 12) or of nylon-6 (PA 6). The melting point of these polyamide blocks, which is also that of the copolymer (B), is generally 10 to 15° C. below that of PA 12 or of PA 6.

Depending on the nature of (A), it may be useful to use a copolymer (B) having a lower melting point so as not to degrade (A) during the incorporation of (B), this being the subject of the second and third embodiments below.

According to a second embodiment of the invention, the polyamide blocks result from the condensation of one or more alpha,omega-aminocarboxylic acids and/or of one or more lactams having from 6 to 12 carbon atoms in the presence of a dicarboxylic acid having from 4 to 12 carbon atoms and have a low mass, that is to say $\overline{M}n$ of 400 to 1000. By way of example of alpha,omega-aminocarboxylic acids, mention may be made of aminoundecanoic acid and aminododecanoic acid. By way of example of dicarboxylic acids, mention may be made of adipic acid, sebacic acid, isophthalic acid, butanedioic acid, 1,4-cyclohexyldicarboxylic acid, terephthalic acid, the sodium or lithium salt of sulphoisophthalic acid, dimerized fatty acids (these dimerized fatty acids have a dimer content of at least 98% and are preferably hydrogenated) and dodecanedioic acid HOOC—$(CH_2)_{10}$—COOH.

By way of example of lactams, mention may be made of caprolactam and lauryllactam.

Caprolactam should be avoided unless the polyamide is purified of the caprolactam monomer which remains dissolved in it.

Polyamide blocks, obtained by the condensation of lauryllactam in the presence of adipic acid or of dodecanedioic acid, have a mass $\overline{M}n$ of 750 and a melting point of 127–130° C.

According to a third embodiment of the invention, the polyamide blocks result from the condensation of at least one alpha,omega-aminocarboxylic acid (or a lactam), at least one diamine and at least one dicarboxylic acid. The alpha,omega-aminocarboxylic acid, the lactam and the dicarboxylic acid may be chosen from those mentioned above.

The diamine may be an aliphatic diamine having from 6 to 12 atoms or it may be an aryl diamine and/or a saturated cyclic diamine.

By way of examples, mention may be made of hexamethylenediamine, piperazine, 1-aminoethylpiperazine, bis(amino-propyl)piperazine, tetramethylenediamine, octamethylenediamine, decamethylenediamine, dodecamethylenediamine, 1,5-diaminohexane, 2,2,4-) trimethyl-1,6-diaminohexane, diamine polyols, isophoronediamine(IPDA), methylpentamethylenediamine(MPDM), bis (aminocyclohexyl)methane (BACM) and bis(3-methyl-4-aminocyclohexyl)methane (BMACM).

In the second and third embodiments of the invention, the various constituents of the polyamide block and their proportion are chosen so as to obtain a melting point of less than 150° C. and advantageously of between 90 and 135° C. Low-melting-point copolyamides are described in Patents U.S. Pat. No. 4,483,975, DE 3,730,504 and U.S. Pat. No. 5,459,230 and the same proportions of the constituents are used for the polyamide blocks of (B). (B) may also be the copolymers described in U.S. Pat. No. 5,489,667.

The polyether blocks may represent from 5 to 85% by weight of (B). The polyether blocks may contain units other than ethylene oxide units, such as, for example, propylene oxide or polytetrahydrofuran (which leads to polytetramethylene glycol chain linkages). It is also possible to use, simultaneously, PEG blocks, i.e. those consisting of ethylene oxide units, PPG blocks, i.e. those consisting of propylene oxide units, and PTMG blocks, i.e. those consisting of tetramethylene glycol units also called polytetrahydrofuran.

Advantageously, PEG blocks or blocks obtained by the oxyethylation of bisphenols, such as bisphenol A for example, may be used. The latter products are described in Patent EP 613,919. The amount of polyether blocks in (B) is advantageously from 10 to 50% by weight of (B) and preferably from 35 to 50%.

The copolymers of the invention may be prepared by any means allowing the polyamide blocks and the polyether blocks to be linked together. In practice, essentially two processes are used, one being called a two-step process and the other a one-step process.

The two-step process firstly consists in preparing the polyamide blocks having carboxylic end groups by the condensation of polyamide precursors in the presence of a chain-stopper dicarboxylic acid and then, in a second step, in adding the polyether and a catalyst. If the polyamide precursors are only lactams or alpha,omega-aminocarboxylic acids, a dicarboxylic acid is added. If the precursors already comprise a dicarboxylic acid, this is used in excess with respect to the stoichiometry of the diamines. The reaction usually takes place between 180 and 300° C., preferably 200 to 260° C., and the pressure in the reactor is set between 5 and 30 bar and maintained for approximately 2 hours. The pressure in the reactor is slowly reduced to atmospheric pressure and then the excess water is distilled off, for example for one or two hours.

Once the polyamide having carboxylic acid end groups has been prepared, the polyether and a catalyst are then added. The polyether may be added in one or more goes, and likewise for the catalyst. According to one advantageous embodiment, the polyether is added first and the reaction of the OH end groups of the polyether with the COOH ends of the polyamide starts, with the formation of ester linkages and the elimination of water. The water is removed as much as possible from the reaction mixture by distillation and then the catalyst is introduced in order to complete the linking of the polyamide blocks to the polyether blocks. This second step takes place with stirring, preferably under a vacuum of at least 5 mmHg (650 Pa) at a temperature such that the reactants and the copolymers obtained are in the molten state. By way of example, this temperature may be between 100 and 400° C. and usually between 200 and 300° C. The reaction is monitored by measuring the torsional moment, or torque, exerted by the polymer melt on the stirrer or by measuring the electric power consumed by the stirrer. The end of the reaction is determined by the value of the torque or of the target power. The catalyst is defined as being any product which promotes the linking of the polyamide blocks to the polyether blocks by esterification. Advantageously, the catalyst is a derivative of a metal (M) chosen from the group formed by titanium, zirconium and hafnium.

By way of example of derivatives, mention may be made of tetraalkoxides which satisfy the general formula $M(OR)_4$, in which M represents titanium, zirconium or hafnium and the Rs, which are identical or different, denote linear or branched, alkyl radicals having from 1 to 24 carbon atoms.

The $C_1$ to $C_{24}$ alkyl radicals from which the radicals R of the tetraalkoxides used as catalysts in the process according to the invention are chosen are, for example, such as methyl, ethyl, propyl, isopropyl, butyl, ethylhexyl, decyl, dodecyl and hexadodecyl. The preferred catalysts are tetraalkoxides for which the radicals R, which are identical or different, are $C_1$ to $C_8$ alkyl radicals. Examples of such catalysts are especially $Z_r(OC_2H_5)_4$, $Z_r(O\text{-iso}C_3H_7)_4$, $Z_r(OC_4H_9)_4$, $Z_r(OC_5H_{11})_4$, $Z_r(OC_6H_{13})_4$, $H_f(OC_2H_5)_4$, $H_f(OC_4H_9)_4$ and $H_f(O\text{-iso}C_3H_7)_4$.

The catalyst used in this process according to the invention may consist only of one or of several of the tetraalkoxides of formula $M(OR)_4$ defined above. It may also be formed by the combination of one or more of these tetraalkoxides with one or more alkali or alkaline-earth metal alcoholates of formula $(R_1O)_pY$ in which $R_1$ denotes a hydrocarbon residue, advantageously a $C_1$ to $C_{24}$ alkyl residue and preferably a $C_1$ to $C_8$ alkyl residue, Y represents an alkali or alkaline-earth metal and p is the valency of Y. The amounts of alkali or alkaline-earth metal alcoholate and of zirconium or hafnium tetraalkoxides which are combined to form the mixed catalyst may vary within wide limits. However, it is preferred to use amounts of alcoholate and of tetraalkoxides so that the molar proportion of alcoholate is approximately equal to the molar proportion of tetraalkoxide.

The weight proportion of catalyst, that is to say of the tetraalkoxide(s), when the catalyst does not contain an alkali or alkaline-earth metal alcoholate, or else of all of the tetraalkoxide(s) and of the alkali or alkaline-earth metal alcoholate(s) when the catalyst is formed by the combination of these two types of compounds, advantageously varies from 0.01 to 5% of the weight of the mixture of the dicarboxylic polyamide with the polyoxyalkylene glycol, and preferably lies between 0.05 and 2% of this weight.

By way of example of other derivatives, mention may also be made of the salts of the metal (M), particularly the salts of (M) and an organic acid and the complex salts between the oxide of (M) and/or the hydroxide of (M) and an organic acid. Advantageously, the organic acid may be formic acid, acetic acid, propionic acid, butyric acid, valeric acid, caproic acid, caprylic acid, lauric acid, myristic acid, palmitic acid, stearic acid, oleic acid, linoleic acid, linolenic acid, carboxylic cyclohexane acid, phenylacetic acid, benzoic acid, salicylic acid, oxalic acid, malonic acid, succinic acid, glutaric acid, adipic acid, maleic acid, fumaric acid, phthalic acid and crotonic acid. Acetic and propionic acids are particularly preferred. Advantageously M is zirconium. These salts may be called zirconyl salts. The Applicant believes that these salts of zirconium and of an organic acid or the complex salts mentioned above release $ZrO^{++}$ during the process, without being bound by this explanation. The product used is the one sold under the name zirconyl acetate. The amount to be used is the same as for the $M(OR)_4$ derivatives.

This process and these catalysts are described in Patents U.S. Pat. No. 4,332,920, U.S. Pat. No. 4,230,838, U.S. Pat. No. 4,331,786, U.S. Pat. No. 4,252,920, JP07145368A, JP 06287547A and EP 613919.

With regard to the one-step process, all the reactants used in the two-step process, that is to say the polyamide precursors, the chain-stopper dicarboxylic acid, the polyether and the catalyst, are mixed together. They are the same reactants and the same catalyst as in the two-step process described above. If the polyamide precursors are only lactams, it is advantageous to add a little water.

The copolymer has essentially the same polyether blocks and the same polyamide blocks, but also a small portion of the various reactants that have reacted randomly, which are distributed randomly along the polymer chain.

As in the first step of the two-step process described above, the reactor is closed and heated, with stirring. The pressure established is between 5 and 30 bar. When the pressure no longer changes, the reactor is put under reduced pressure while still maintaining vigorous stirring of the molten reactants. The reaction is monitored as previously in the case of the two-step process.

The catalyst used in the one-step process is preferably a salt of the metal (M) and of an organic acid or a complex salt between the oxide and/or hydroxide of (M) and an organic acid.

With regard to the compatibilizers (C1), the unsaturated carboxylic acid anhydride may be chosen, for example, from maleic, itaconic, citraconic, allyl succinic, cyclohex-4-ene-1,2-dicarboxylic, 4-methylenecyclohex-4-ene-1,2-dicarboxylic, bicyclo(2,2,1)hept-5-ene-2,3-dicarboxylic and x-methylbicyclo(2,2,1)hept-5-ene-2,2-dicarboxylic anhydrides. Advantageously, maleic anhydride is used. The number-average molar mass is between 800 and 10,000 and preferably between 1000 and 3500. (C1) may be represented by the following formula:

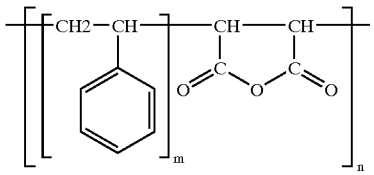

in which MAH denotes maleic anhydride, m varies from 1 to 3 and n varies from 6 to 8. These copolymers may be partially esterified, between 35 and 75%, by alcohols. These products are sold under the name SMA® RESINS by Elf Atochem.

With regard to th compatibilizers (C2), these may be polyethylenes grafted by an unsaturated carboxylic acid anhydride or copolymers of ethylene and of an unsaturated carboxylic acid anhydride obtained, for example, by radical polymerization.

With regard to the polyethylenes onto which the unsaturated carboxylic acid anhydride is grafted, these should be understood to mean the polyethylene of homopolymers or copolymers.

By way of comonomers, mention may be made of:

alpha-olefins, advantageously those having from 3 to 30 carbon atoms; by way of example of alpha-olefins, mention may be made of propylene, 1-butene, 1-pentene, 3-methyl-1-butene, 1-hexene, 4methyl-1-pentene, 3-methyl-1-pentene, 1-octene, 1-decene, 1-dodecene, 1-tetradecene, 1-hexadecene, 1-octadecene, 1-eicocene, 1-dococene, 1-tetracocene, 1-hexacocene, 1-octacocene and 1-triacontene; these alpha-olefins may be used by themselves or as a mixture of two or more of them;

the esters of unsaturated carboxylic acids, such as, for example, alkyl(meth)acrylates, the alkyls possibly having up to 24 carbon atoms; examples of alkyl acrylates or methacrylates are, especially, methyl methacrylate, ethyl acrylate, n-butyl acrylate, isobutyl acrylate and 2-ethylhexyl acrylate;

vinyl esters of saturated carboxylic acids, such as, for example, vinyl acetate or vinyl propionate;

dienes such as, for example, 1,4-hexadiene.

The polyethylene may include several comonomers.

Advantageously, the polyethylene, which may be a blend of several polymers, comprises at least 50 mol % and preferably 75 mol % of ethylene and its density may be between 0.86 and 0.98 g/cm$^3$. The MFI (viscosity index at 190° C./2.16 kg) is advantageously between 1 and 1000 g/10 min.

By way of example of polyethylenes, mention may be made of:

low-density polyethylene (LDPE);

high-density polyethylene (HDPE);

linear low-density polyethylene (LLDPE);

very low-density polyethylene (VLDPE);

polyethylene obtained by metallocene catalysis, that is to say polymers obtained by the copolymerization of ethylene with an alpha-olefin such as propylene, butene, hexene or octene in the presence of a single-site catalyst generally consisting of a zirconium or titanium atom and of two alkyl cyclic molecules linked to the metal. More specifically, metallocene catalysts are usually composed of two cyclopentadiene rings linked to the metal. These catalysts are frequently used with aluminoxanes as cocatalysts or activators, preferably methyl aluminoxane (MAO). Hafnium may also be used as the metal to which the cyclopentadiene is fixed. Other metallocenes may include transition metals of Groups IVA, VA and VIA. Metals from the series of lanthanides may also be used;

EPR (ethylene—propylene—rubber) elastomers;

EPDM (ethylene—propylene—diene monomer) elastomers;

blends of polyethylene with an EPR or an EPDM;

ethylene-alkyl(meth)acrylate copolymers possibly containing up to 60%, and preferable 2 to 40%, by weight of (meth)acrylate.

The grafting is an operation known per se.

With regard to the copolymers of ethylene and unsaturated carboxylic acid anhydride, that is to say those in which the unsaturated carboxylic acid anhydride is not grafted, these are copolymers of ethylene, unsaturated carboxylic acid anhydride and possible another monomer which may be chosen from the comonomers mentioned above in the case of the ethylene copolymers intended to be grafted.

Advantageously, ethylene-maleic anhydride and ethylene-alkyl(meth)acrylate-maleic anhydride copolymers are used. These copolymers comprise from 0.2 to 10% by weight of maleic anhydride and from 0 to 40% by weight of alkyl(meth)acrylate. Their MFI is between 1 and 50 (190° C.–2.16 kg). The alkyl (meth)acrylates have already been described above.

It would not be outside the scope of the invention to replace the unsaturated carboxylic acid anhydride in (C2) with an unsaturated carboxylic acid such as (meth)acrylic acid, this functional group possibly being partially neutralized by a metal (Zn) or an alkali metal (Li), giving, in this case, ionomers. Ionomers of this type are sold by Du Pont under the brand name SURLYN®.

With regard to the compatibilizers (C3), the copolymer of ethylene and an unsaturated epoxy may be obtained by copolymerizing ethylene with an unsaturated epoxy or by grafting the unsaturated epoxy onto the polyethylene. The grafting may be carried out in a solvent phase or on the polyethylene melt in the presence of a peroxide. These grafting techniques are known per se. As regards the copolymerization of ethylene with an unsaturated epoxy, the so-called radical polymerization processes may be used, these normally being carried out at pressures between 200 and 2500 bar.

By way of example of unsaturated epoxies, mention may be made of:

aliphatic glycidyl esters and ethers, such as allyl glycidyl ether, vinyl glycidyl ether, glycidyl maleate and itaconate, and glycidyl(meth)acrylate; and alicyclic glycidyl esters and ethers, such as 2-cyclohexene-1-yl-glycidyl ether, diglycidyl cyclohexene-4,5-carboxylate, glycidyl cyclohexene-4-carboxylate, glycidyl 2-methyl-5-norbornene-2-carboxylate and diglycidyl endo-cis-bicyclo[2,2,1] hept-5-ene-2,3-dicarboxylate.

With regard to grafting, the compatibilizer (C3) is obtained by grafting a homopolymer or copolymer polyethylene as described in the case of (C2) except that an epoxy is grafted instead of an anhydride. With regard to copolymerization, this is also similar to (C2) except that an epoxy is used; there may also be other comonomers, as in the case of (C2).

Advantageously, the compatibilizer (C3) is an ethylene/alkyl(meth)acrylate/unsaturated epoxy copolymer. Advantageously it may contain up to 40% by weight of alkyl(meth)acrylate and up to 10%, preferably 0.1 to 8%, by weight of unsaturated epoxy.

Advantageously, the epoxy is glycidyl(meth)acrylate.

Advantageously, the alkyl(meth)acrylate is chosen from methyl(meth)acrylate, ethyl acrylate, n-butyl acrylate, isobutyl acrylate and 2-ethylhexyl acrylate. The amount of alkyl(meth)acrylate is advantageously from 20 to 35%. The MFI is advantageously between 1 and 50 (in g/10 min at 190° C. under 2.16 kg). This copolymer may be obtained by the radical polymerization of the monomers.

With regard to the compatibilizers (C4), they are polystyrene/polybutadiene/polystyrene copolymers (SBS), polystyrene/polyisoprene/polystyrene copolymers (SIS), they can be hydronenated. It means they can be polystyrene/poly(ethylene-butene)/polystyrene copolymers (SEBS), polystyrene/poly(ethylene-propylene)/polystyrene copolymers (SEPS). Such block copolymers are described in Ullmann's Encyclopedia of Industrial Chemistry, Vol A 26, pages 655–463, fith edition, 1995. These block copolymers are grafted, by acrylic acid or maleic anhydride.

It would not be outside the scope of the invention to use one or more compatibilizers (C1), one or more compatibilizers (C2), one or more compatibilizers (C3), one or more compatibilizers (C4) or a mixture of at least two of these compatibilizers.

The antistatic behaviour increases with the proportion of (B) and, for equal amounts of (B), with the proportion of ethylene oxide units contained in (B).

The amount of (B)+(C) is advantageously from 5 to 20 parts per 95 to 80 parts of (A) and preferably from 10 to 15 parts per 90 to 85 parts of (A). The ratio (B)/(C) is advantageously between 4 and 6.

It would not be outside the scope of the invention to add mineral fillers (talc, $CaCO_3$, kaolin, etc.), reinforcing agents (glass fibre, mineral fibre, carbon fibre, etc.), stabilizers (heat stabilizers and UV stabilizers), fire retardants and colorants.

The compositions of the invention are prepared by the usual techniques for thermoplastics, such as, for example, by extrusion or with the aid of twin-screw mixers.

The present invention also relates to articles manufactured from the above compositions; these are, for example, films, tubes or pipes, sheets, packaging, and computer or telephone casings.

EXAMPLES

In the examples below, the following ingredients are used:

PS: this is an impact polystyrene. This copolymer is characterized by a melt flow index at 200° C. under 5 kg of between 3 and 5 g/10 min (ISO 1133:91 standard). It is also characterized by a Vicat temperature of 97° C. (ISO 306A50 standard) and an Izod impact strength (ISO 180/1A standard) of 10 kJ/m². It is sold by Elf Atochem under the reference LAC-QRENE®4241.

Pebax®: this is a copolyether-block-amide having nylon-12 blocks of 1500 number-average molar mass and PEG blocks of 1500 number-average molar mass; the MFI is 14 at 235° C./1 kg and the melting point is 158° C.

Lotader® AX: ethylene-methyl acrylate-glycidyl methacrylate terpolymer. This terpolymer has an MFI of 6 (190° C./325 g) and a melting point of 63° C.

SMA®2625: partially esterified styrene-maleic anhydride copolymer (such that m=2 in the abovementioned formula), of 1900 average molar mass, having a melting range of 135–150° C. and an acid number between 200 and 240 mg KOH/g.

Orevac®: ethylene-methyl acrylate copolymer grafted with maleic anhydride. This product has a melting point of 65° C. and an MFI of 3.5 under 190° C./2.16 kg conditions.

In the examples which follow, the following characterization techniques were used:

Mechanical properties:

The compositions obtained were injection moulded at temperatures of 200 to 220° C. in the form of dumb bells or plaques. The dumb bells allow the tensile tests to be carried out according to the ISO R527 standard.

Antistatic properties:

Plaques of dimensions 100 mm×100 mm×2 mm are injection moulded and allow the resistivity measurements to be carried out according to the IEC-93 standard. The surface resistivity is measured in ohms/□ and the half-discharged time (CDT) in seconds; the properties obtained under tension are also given. All the tests are carried out at 23° C. The plaques are conditioned at 50% humidity for 15 days before being tested in the case of the surface resistivity measurement.

Examples 1 to 5

A Buss co-kneader of length equal to eleven times the diameter (Buss 11D) with a total throughput of 25 kg/h is used. This throughput represents the sum of the throughputs of the ingredients used. The temperature settings of the barrels are those normally used for a polystyrene, that is to say from 200 to 220° C. The strands output by the machine are cooled in a water tank and converted into granules. These granules are injection moulded in the form of plaques or dumb bells at a temperature of between 220 and 240° C. The results are given in Table 1 below.

TABLE 1

| | | | | | | |
|---|---|---|---|---|---|---|
| PS | 100 | 90 | 88 | 88 | 88 | 88 |
| Pebax | | 10 | 10 | 10 | 110 | 10 |
| Orevac | | | 2 | | | |
| SMA 2625 | | | | 2 | | 1 |
| Lotader AX | | | | | 2 | 1 |
| $R_s$ (Ω/□) | 1.6 $10^{+15}$ | 8.0 $10^{+12}$ | 3.0 $10^{+12}$ | 4.0 $10^{+12}$ | 3.0 $10^{+12}$ | 3.0 $10^{+12}$ |
| CDT (s) | 53 | 4 | 4 | 3 | 6 | 4 |
| Yield stress (MPa) | 30.4 | 27.4 | 27.6 | 28 | 27.5 | 27.9 |
| Yield strain (%) | 1.4 | 1.6 | 1.6 | 1.6 | 1.6 | 1.6 |
| Tensile strength (MPa) | 23.6 | 19.6 | 21.9 | 22.3 | 22.6 | 22.9 |
| Elongation at break (%) | 34 | 12 | 43 | 40 | 57 | 56 |

What is claimed is:

1. A polymer composition comprising, per 100 parts by weight:
    99 to 60 parts of a styrene polymer (A), selected from the group consisting of polystyrene, acrylonitrile-butadiene-styrene copolymer (ABS), elastomer-modified polystyrene and mixtures thereof,
    1 to 40 parts of (B)+(C),
(B) being a copolymer containing polyamide blocks and polyether blocks comprising ethylene oxide units —($C_2H_4$—O)—, (C) being a compatibilizer comprising, (C3), an ethylene/alkyl-(meth)acrylate/unsaturated epoxy terpolymer and, optionally, (C1), a copolymer of styrene and maleic anhydride having an average molar mass of between 800 and 10,000, (B)/(C) having a weight ratio between 2 and 10.

2. A composition according to claim 1, in which (A) comprises at least one of polystyrene and elastomer-modified polystyrene.

3. A composition according to claim 1, in which (A) comprises at least one of an acrylonitrile-butadiene-styrene copolymer ABS and elastomer-modified polystyrene.

4. A composition according to claim 1, wherein (C) comprises (C1) in which (C1) comprises a copolymer of styrene and maleic anhydride having an average molar mass of between 800 and 10,000, having per copolymer 6–24 styrene units and 6–8 maleic anhydride units.

5. A composition according to claim 1, wherein (C3) is an ethylene/alkyl(meth)acrylate/unsaturated epoxy terpolymer containing up to 40% by weight of alkyl(meth)acrylate and up to 10% by weight of unsaturated epoxy.

6. A composition according to claim 5, wherein (A) comprises an elastomer-modified polystyrene or polystyrene.

7. A composition according to claim 6, wherein (C) comprises ethylene-methyl acrylate-glycidyl(meth)acrylate terpolymer.

8. A composition according to claim 6, wherein (C) comprises ethylene-methyl acrylate-glycidyl(meth)acrylate terpolymer, the glycidyl(meth)acrylate units being present in amount of 0.1–8% by weight of said terpolymer.

9. A composition according to claim 6, wherein (A) comprises polystyrene.

10. A composition according to claim 1, wherein the amount of (B)+(C), is by weight, from 5 to 20 parts per 95 to 80 parts by weight of (A).

11. A composition according to claim 1, wherein the weight ratio (B)/(C) is between 4 and 6.

12. An article selected from the group consisting of film, pipe, sheets, packaging, computer casings, and telephone casings, said article comprising a composition according to claim 1.

13. A composition according to claim 1, wherein (C) comprises (C1).

14. A process comprising shaping a composition according to claim 1 into an article selected from the group consisting of film, pipe, sheets, packaging, computer casings, and telephone casings.

15. A composition according to claim 1, wherein said styrene polymer (A) comprises an elastomer-modified polystyrene.

16. A composition according to claim 15, wherein (C) comprises an ethylene/alkyl(meth)acrylate-unsaturated epoxy terpolymer containing up to 40% by weight of alkyl(meth)acrylate and up to 30% by weight of unsaturated epoxy.

17. A composition according to claim 16, wherein (C) comprises ethylene-methyl acrylate-glycidyl(meth)acrylate terpolymer.

18. A composition according to claim 17, wherein (C) comprises ethylene-methyl acrylate-glycidyl(meth)acrylate terpolymer the glycidyl(meth)acrylate units being present in amount of 0.1–8% by weight of said terpolymer.

19. A composition according to claim 18, wherein (A) comprises polystyrene.

20. A composition according to claim 15, wherein the elastomer of said elastomer-modified polystyrene is polybutadiene.

21. A polymer composition consisting of per 100 parts by weight:

99 to 60 parts of a styrene polymer (A), selected from the group consisting of polystyrene, acrylonitrile-butadiene-styrene copolymer (ABS), elastomer-modified polystyrene and mixtures thereof, 1 to 40 parts of (B)+(C), (B) being a copolymer containing polyamide blocks and polyether blocks comprising ethylene oxide units —$C_2H_4$—O)—, (C) being a compatibilizer comprising, (C3), an ethylene/alkyl-(meth)acrylate/unsaturated epoxy terpolymer and, optionally, (C1), a copolymer of styrene and maleic anhydride having an average molar mass of between 800 and 10,000, (B)/(C) having a weight ratio between 2 and 10.

22. A polymer composition consisting essentially of, per 100 parts by weight:

99 to 60 parts of a styrene polymer (A), selected from the group consisting of polystyrene, acrylonitrile-butadiene-styrene copolymer (ABS), elastomer-modified polystyrene and mixtures thereof, 1 to 40 parts of (B)+(C), (B) being a copolymer containing polyamide blocks and polyether blocks comprising ethylene oxide units —($C_2H_4$—O)—, (C) being a compatibilizer comprising, (C3), an ethylene/alkyl-(meth)acrylate/unsaturated epoxy terpolymer and, optionally, (C1), a copolymer of styrene and maleic anhydride having an average molar mass of between 800 and 10,0000, (B)/(C) having a weight ratio between 2 and 10.

* * * * *

UNITED STATES PATENT AND TRADEMARK OFFICE
CERTIFICATE OF CORRECTION

PATENT NO.   : 6,825,270 B1
DATED        : November 30, 2004
INVENTOR(S)  : Christophe Lacroix It is certified that error appears in the above-identified patent and that said Letters Patent is hereby corrected as shown below:

Title page,
Item [75], Inventors, delete "Puteaux" and insert -- Harquency --
Item [22], PCT filing date, delete "June. 26, 2000" and insert -- July 26, 2000 --
Item [86], delete "Jul. 7, 2001" and insert -- June 7, 2001 --

Column 12,
Line 26, delete "$-C_2H_4$" and insert -- $-(C_2H_4-$ --.
Line 48, delete "10,0000" and insert -- 10,000 --.

Signed and Sealed this

Seventeenth Day of May, 2005

JON W. DUDAS
*Director of the United States Patent and Trademark Office*